United States Patent [19]

Seiderman

[11] 4,408,845
[45] Oct. 11, 1983

[54] IONICALLY COAGULATED HYDROPHILIC POLYELECTROLYTE CONTACT LENS

[76] Inventor: Maurice Seiderman, 3306 Deronda Dr., Hollywood, Calif. 90068

[21] Appl. No.: 208,490

[22] Filed: Nov. 17, 1980

Related U.S. Application Data

[62] Division of Ser. No. 78,196, Sep. 24, 1979, Pat. No. 4,273,734.

[51] Int. Cl.$^3$ ............................................. G02C 7/04
[52] U.S. Cl. ........................... 351/160 H; 204/181 F; 536/3
[58] Field of Search ..................... 351/160 R, 160 H; 204/132, 181 F; 536/3

[56] References Cited

U.S. PATENT DOCUMENTS

| | | | |
|---|---|---|---|
| 3,349,079 | 10/1967 | Freedman | 536/3 |
| 3,386,921 | 6/1968 | Schweiger et al. | 536/3 X |
| 3,556,969 | 1/1971 | Mizuguchi et al. | 204/181 F |
| 3,963,662 | 6/1976 | Fujiwara et al. | 351/160 H X |
| 4,003,792 | 1/1977 | Mill et al. | 536/3 X |
| 4,043,952 | 8/1977 | Ganslaw et al. | 536/3 X |
| 4,168,112 | 9/1979 | Ettis et al. | 351/160 H |
| 4,223,984 | 9/1980 | Miyata et al. | 351/160 H |
| 4,268,131 | 5/1981 | Miyata et al. | 351/160 H |

*Primary Examiner*—John K. Corbin
*Assistant Examiner*—Scott J. Sugarman
*Attorney, Agent, or Firm*—Burns, Doane, Swecker & Mathis

[57] ABSTRACT

Conformable hydrogel molds or forms are adapted for the casting of polyelectrolytic materials whereby an irreversibly gelled, three dimensional article faithfully reproduces the interior topography of the mold.

3 Claims, No Drawings

IONICALLY COAGULATED HYDROPHILIC POLYELECTROLYTE CONTACT LENS

This is a division of application Ser. No. 078,196, filed Sept. 24, 1979, now Pat. No. 4,273,734.

BACKGROUND OF THE INVENTION

The present invention relates to conformable molds of hydrogel which are adapted for the casting of polyelectrolytic materials. The present invention also relates generally to the articles formed thereby, and specifically, to transparent contact lenses.

Hydrogel materials comprising hydrophilic polymers are well known to the prior art. These hydrogels are capable of absorbing ionic substances from aqueous solutions when the hydrogel is hydrated or equilibrated in such solutions. The speed of absorption, degree of swelling upon hydration, hardness and flexibility are capable of being tailored to yield precise physical properties. The ability to alter or otherwise predict these physical properties rests, primarily, upon the chemical composition of the hydrogen and, to a lesser degree, upon the aqueous ionic solution employed for hydration or equilibration. When the hydrogen is hydrated with such ionic aqueous solutions, controlled delivery of the ionic species therefrom is readily achieved.

Polyelectrolytic materials are similarly known in the prior art, and are characterized as possessing active charged sites termed polarites. When certain polyelectrolytic materials are contacted by ionic species, they will gel or congeal into a self-sustaining mass, rather than form a flocculent precipitate, upon proper control of the chemical environment. Examples of naturally occuring products exhibiting these characteristics are various polysaccharides including gelatins, alginates, etc. Additionally, synthetic materials such as sodium acrylate, complexes of acrylic acid, styrene, and copolymeric reaction products of sulfonic acid similarly are capable of gelling or congealing upon treatment with specific ionic species.

SUMMARY OF THE INVENTION

In accordance with the foregoing observations, it is a major object of the present invention to cast polyelectroyltic materials is ionically equilibrated hydrogel molds.

It is another object of the present invention to cast polyelectrolytic materials into useful shapes which accurately reproduce the internal topography of the mold cavity.

It is yet another object of the present invention to cast polyelectrolytes in a simple, convenient, and highly economical manner.

It is a further object of the present invention to cast irreversibly-gelled, transparent contact lenses in a simple, efficient and economical manner.

Yet other objects of the present invention wll become apparent to the skilled artisan upon examination of the following detailed description of the invention.

In accordance with the present invention, it has now been determined that a mold of hydrogel material which has been equilibrated in an ionic solution enhances the "gelatinization" or "ionic coagulation" of polyelectrolytic materials into self-sustaining, three-dimensional articles which faithfully reproduce the internal topography of the mold cavity.

DETAILED DESCRIPTION OF THE INVENTION

The present invention relates to the casting of polyelectrolytic materials and, more particularly, to the casting of such materials in an ionically-equilibrated, hydrated hydrogel mold. Of particular interest is the casting of irreversibly gelled, clear transparent articles adapted for use as contact lenses, whether corneal or scleral.

Various hydrogel materials are readily available in the market place and may be commerically procured in shapes including rods, tubes, discs, buttons, blocks, and the like. In the anhydrous condition, hydrogels are easily machinable to exacting tolerances and, accordingly, standard mold cavities may readily be manufactured from these materials.

Hydrogels, when hydrated or equilibrated in aqueous solutions, swell in proportion dictated by their basic chemical compositions, and, to a lesser degree, by the ionic substances present in the aqueous solution. Volume increases of 30% or more are common when hydrogels are equilibrated in aqueous solutions. Moreover, hydrogels may be tailored with respect to other physical properties such as speed of absorption, and thus release, of the ionic species in the equilibrating solution, hardness and flexibility. Exemplary of particularly useful hydrogel materials formed from hydrophilic polymers are those described in U.S. Pat. Nos. 3,503,942, 3,639,524, 3,721,657, 3,767,731 and 3,792,028 to Seiderman, U.S. Pat. No. 3,621,079 to Leeds, U.S. Pat. No. 3,647,736 to Steckler, U.S. Pat. Nos. 3,758,498 and 3,787,380 to Stamberger and U.S. Pat. Nos. 2,976,576, 3,220,960 and RE 27,401 to Wichterle et al. Most preferred is a hydrogel prepared from an ambient cure recipe including 80 parts by weight hydroxyethylmethacrylate, 20 parts by weight N-vinyl-2-pyrrolidone, 1.17 parts by weight, ethylene glycol dimethacrylate, benzoyl peroxide catalyst and a small amount of a polymerization accelerator; compare the U.S. Pat. No. 3,721,657 to Seiderman.

The polyelectrolytic materials employed in the present casting technique exhibit active charged sites termed polarities. When influenced by ionic substances, these polyelectrolytic materials will gel or congeal into a self-sustaining mass which faithfully reproduces the internal topography of the mold cavity. Exemplary of these polyelectrolytic materials are natural products such as gelatin, alginate, and the like, as well as synthetic materials such as sodium acrylate, complexes of acrylic acid, styrene, or copolymeric reaction products of sulfonic acid. Additionally, it has been determined that undenatured collagen, e.g., collagen fibrils and tropocollagen, may be cast and formed into various shapes by the techniques of the present invention. Other suitable and exemplary polyelectrolytic materials are disclosed in "Polyelectrolytes", *Encyclopedia of Polymer Science and Engineering*, 10, Interscience Publishers (1968), hereby expressly incorporated by reference and relied upon.

Polyvinyl alcohol may be employed to control the viscosities of certain of the casting mixtures. The polyvinyl alcohol mixes well with some of the noted polyelectrolytes and exhibits no deleterious effects thereon.

In order to further elucidate upon the objects and advantages of the present invention, the following specific examples will be given, which are intended to be exemplary and in no way limitative. Also, for the sake of description, the following examples will relate to the casting of various natural substances, it being appreciated that numerous other polyelectrolytic materials are similarly suitable for use in conjunction with the techniques of the present invention.

Alginates, naturally occuring polysaccharides, may be derived from proper chemical treatment of seaweed, and exhibit an affinity for various metallic ions. For example, when calcium ions are added in increasing amounts to a sodium alginate solution, the viscosity of the solution increases to a maximum value, the relationship between viscosity and the amount of calcium ions added being a function of the amount of sodium ions. The viscosity response for particular divalent metal ion is dependent upon:

[1] the affinity of the metal ion for alginic acid which, in turn, relates to the amount of metal bound to the alginate in a solution containing a certain concentration of metal ions; and

[2] the gel-forming ability of the metal ion which determines the amount of metal which must be bound to the alginate to effect precipitation from solution.

If an alginate gel is formed by the diffusion of a divalent metal ion into an alginate solution, the gel is birefringent as a consequence of preferred orientation of the polymer chains during precipitation. High orientation calcium alginate gels are obtainable from sodium alginate solutions under properly controlled conditions. These highly oriented polymerization gels are thought to arise from a crosslinkage through the divalent ions involving carboxyl and hydroxyl groups of different chains which yield a micromolecule after sufficient growth gelation or precipitation occurs.

While the calcium derivatives are most preferred with respect to the present invention, various other suitable metallic ions may be employed. These include lead, barium, strontium, copper, cadmium, beryllium, zinc, cobalt, nickel, manganese, magnesium, silver, potassium, sodium and lithium. These various ions may be added as metallic salts provided, however, the salt is soluble in water, and include chlorides, nitrates, carbonates, and the like. Insofar as a major object of the present invention is to provide contact lenses, it must be borne in mind that certain of the aforenoted materials are not wholly compatible with the animal body. Accordingly, the preferred metallic salt is calcium chloride. Should it be desirable for any reason to employ a different salt, the incompatible ions present in the gel may be removed by appropriate extraction, e.g., soaking and/or ion exchange, following the gelatinization of the alginate.

EXAMPLE 1

A mold cavity is prepared from a hydrogel composition of:

hydroxyethylmethacrylate: 70.5 parts
N-vinyl-2-pyrrolidone: 28.7 parts
crosslinking agent [ethylene glycol dimethacrylate]: 0.5 parts
catalysts, activators, etc.: 0.3 parts Positive and negative mold portions are machined to yield, upon hydration, a mold cavity precisely defining the exterior shape of the resultant contact lens, the machining taking into account a degree of ultimate swelling of the mold portions of approximately 30% upon hydration.

The mold portions are immersed in a 0.5% solution of calcium chloride until totally equilibrated. Upon equilibration, the negative portion of the mold cavity is charged with ½ cc of an approximately 2% sodium alginate aqueous solution in de-ionized, distilled water. The mold is then closed to allow reaction between the sodium alginate and calcium ions. After approximately 30 minutes, the mold is opened and an irreversibly gelled, transparent contact lens is removed.

Flash is removed on a Teflon form with a trephine. The contact lens is then soaked in a normal saline solution.

EXAMPLE 2

The mold of Example 1 is prepared in like manner and the cavity is charged with a de-ionized, distilled water solution containing 2% sodium alginate and 2% of a compatible sugar. The compatible sugar is a sucrose polymer linked with epichlorohydrin and is commercially available under the tradename "FICOLL". After approximately 10 minutes, the mold is opened and an irreversibly gelled contact lens removed. Flash is removed on a Teflon form with a trephine and the finished contact lens soaked in normal saline. The contact lens weighs approximately 4 mg when dry.

EXAMPLE 3

The mold of Example 1 is prepared in like manner and the mold cavity charged with an approximately 6% deionized, distilled water solution of tropocollagen. After standing overnight the mold is open and an irreversibly gelled contact lens is removed.

The foregoing examples illustrate the ease with which contact lenses may be formed from polyelectrolytic materials. These contact lenses exhibit good transparency characteristics and are self-sustaining due to the irreversible gelatinization. An orderly structure is produced which exhibits a great degree of birefringence observed upon optical rotation.

Experimentation with various permutations of both (1) solution strength of the equilibrating solution and the (2) charging solution, as well as combination of various charging materials has provided yet other favorable results. By "solution" immediately hereinabove and in the claims, there is intended both true solutions, as well as dispersions, slurries and the like. For example, the equilibrating solution of calcium chloride may vary in concentration from about 0.1% to 10%. Such variation, absent other considerations, effects the speed of gelling in direct proportion. Satisfactory articles have abeen produced using concentrations of up to 10% calcium chloride. Preferred, however, is a concentration within the range 0.5% to 1.5%.

In connection with the fabrication of contact lenses by employing the foregoing techniques, transparency is the major consideration. Should it be desirable to reinforce the irreversible gel for applications requiring transparency, the incorporation of a transparent filler is most preferred. Also, it is a major consideration that a filler be totally compatible with both the gelled article and the human or animal body for contact lens applications. Suitable fillers include, but are not limited to, cellobiose, sugars, alginates, and other various long chain ionically responsive organic materials. For example, insoluble particles of alginic acid derivatives may be incorporated in the sodium alginate solution from which the contact lens is formed. Also, finely comminuted collagen, such as that fully described in my earlier U.S. Pat. No. 3,563,228, may similarly be employed as reinforcement. Obviously, if transparency is not a major consideration, since the instant invention has a broader range of applicability than only contact lenses, other organic or inorganic fillers may be added to supplement the strength of the irreversibly gelled article.

From the foregoing, it is manifestly evident that the formation of irreversible gels of the enumerated polyelectrolytic materials, both natural and synthetic, is simple, efficient, and highly economical in methodology and yields high quality products. It has further been determined that collagen, e.g., collagen fibrils and tropocollagens may be fabricated into, for example, contact lenses, employing identical methodology. Along these lines, however, it is appreciated that the collagen solution will gel effectively only under the influence of an electrical current. This electrical current may be derived from an external source of a few milliamps or may arise from ionic transport accompanying galvanic interaction. In either event, high quality collagen articles are obtainable and the aforenoted objects and advantages may be realized.

EXAMPLE 4

A mold is made as set forth in Example 1. After hydration, calcium ion is removed by soaking in an electrolytic solution capable of rendering the mold sections conductive. An insulating ring is attached to the negative mold section which is then charged with a 10% undenatured collagen dispersion prepared in accordance with U.S. Pat. No. 3,563,228. The mold is then closed and a 6 volt battery connected thereto. Under the influence of the resultant direct current, the collagen electrochemically links to yield a finished contact lens.

As with the lenses formed in Examples 1 to 3, supra, various fillers may be added. However, this is purely an optional addition. Moreover, the index of refraction of, e.g., any alginate or like lens, may be modified by addition of collagen fibrils to the, e.g., alginate starting solution.

While the invention has now been described with respect to certain preferred embodiments thereof, and illustrated in terms of various examples, it will be appreciated by the skilled artisan that various omissions, modifications, substitutions and other changes may be made without departing from the spirit thereof. Accordingly, it is intended that the invention be limited only by the scope of the following claims.

What is claimed is:

1. A contact lens, comprising a transparent, self-sustaining and three-dimensional, irreversibly gelled, ionically coagulated hydrophilic polyelectrolyte material hydrated with water, said polyelectrolyte material being selected from the group consisting of naturally occuring polysaccharides and collagen.

2. The contact lens of claim 1 wherein said polyelectrolytic material is an alginate.

3. The contact lens of claim 1, wherein the polyelectrolyte material comprising the lens is metal ion-coagulated.

* * * * *